United States Patent [19]

Harada et al.

[11] Patent Number: 5,049,401

[45] Date of Patent: Sep. 17, 1991

[54] GLUCOMANNAN PRODUCT AND A METHOD TO COAGULATE IT

[75] Inventors: Seiki Harada, Zushi; Masatsugu Ito, Tokyo; Koichi Iwanami, Tokyo; Kenichi Hashimoto, Tokyo, all of Japan

[73] Assignees: Uni Colloid Kabushiki Kaisha, Kanagawa; Nippon Oil and Fats Company, Limited, Tokyo, both of Japan

[21] Appl. No.: 496,204

[22] Filed: Mar. 19, 1990

[30] Foreign Application Priority Data

Mar. 17, 1989 [JP] Japan ................................ 1-63538

[51] Int. Cl.$^5$ ........................................... A23L 1/0528
[52] U.S. Cl. ..................................... 426/573; 426/96; 426/99; 426/578; 426/661
[58] Field of Search ................... 426/96, 99, 550, 578, 426/661, 573

[56] References Cited

U.S. PATENT DOCUMENTS 1,286,904 12/1918 Atkinson .............................. 426/562
4,022,917 5/1977 Selenke ................................ 426/99

FOREIGN PATENT DOCUMENTS 62-118861 5/1987 Japan .

*Primary Examiner*—Donald E. Czaja
*Assistant Examiner*—John Mowbray
*Attorney, Agent, or Firm*—Wenderoth, Lind & Ponack

[57] ABSTRACT

The present invention provides a product containing glucomannan mixed with encapsulated acidic material having a wall made of hydrophobic substance which melts at a temperature higher than the coagulating temperature of the glucomannan. Because this acidic material is covered with a wall, when alkali is added to the mixture which is then heated, the glucomannan is coagulated. Then, the wall of the encapsulated material is melted by heating to liberate acid, neutralizing the alkaline substance, and producing a slightly alkaline, neutral or acidic glucomannan coagulated product. Further, although the glucomannan coagulated product has a water-releasing property, this can be reduced by adding other natural polysaccharides. Also, a decrease of elasticity caused by neutralization can be eliminated by adding food cellulose.

17 Claims, No Drawings

GLUCOMANNAN PRODUCT AND A METHOD TO COAGULATE IT

BACKGROUND OF THE INVENTION

Konjac has been eaten in the past because it has specific taste and palatability and is a low calorie food. Konjac is produced as follows: To konjac powder mainly consisting of glucomannan, water is added usually in the quantity by 20-50 times more (weight) than the powder, and the mixture is left for about 1 to 2 hours at the temperature of about 30° C. for swelling. Then, the temperature is increased to about 65° C., and alkaline solution such as lime or sodium carbonate is added. It is then mixed and is left for about 20 to 60 minutes to coagulate glucomannan.

Because alkaline substance (coagulant) remains in the coagulated product, the coagulated product normally exhibits strong alkalinity of about pH 12. To obtain better taste and palatability, attempts have been made to decrease the pH value of konjac and to coagulate glucomannan at lower alkalinity. An alkalinity of at least pH 10 is required to coagulate glucomannan within adequate time A new method has also been proposed, in which the coagulated konjac is heated to about 60°-80° C. and the excessive alkaline substances are neutralized by processing it with a solution of acidic substance for about 10 to 20 minutes. Once coagulated, glucomannan maintains its coagulated status even when neutralized.

However, in the neutralizing process of the coagulated product of glucomannan as described above, the acidic substances are not uniformly diffused in the entire coagulated product. The final product thus produced is not homogeneous in quality and the process is by no means satisfactory Also, the neutralization of konjac causes the loss of elasticity, which is specific to konjac, and this decreases the taste and palatability of the food.

Further, when it is used simultaneously with other food materials, water is gradually released from the konjac, and the other food materials often become moist.

SUMMARY OF THE INVENTION

The present invention provides a glucomannan product and a method to coagulate it, which are characterized in that a long time is not required for coagulation, the tissues of the coagulated product are not destroyed, and a homogeneous product of only slightly alkaline, neutral or acidic glucomannan with better elasticity and water-lowering property is obtained.

According to the present invention, a substance consisting mainly of glucomannan and also comprising encapsulated acidic material in the form of an acidic substance covered with a wall of hydrophobic substance is swollen with water, and glucomannan is coagulated under the presence of alkaline substance at a temperature which does not melt the above wall. The coagulated product thus obtained is heated to higher than the melting point of the above wall, and the alkaline substance remaining in the coagulated product is neutralized by the released acidic substance.

Further, encapsulated alkaline material comprising an alkaline substance covered with a hydrophobic wall is added to the above glucomannan product, and the product is suspended and swollen in water maintained at a temperature not to melt the wall of the encapsulated alkaline material. Then, the temperature is increased to the point where the wall of the encapsulated alkaline material is molten but the encapsulated acidic material wall does not melt, and glucomannan is coagulated by the released alkaline substance. The product is then heated to higher than the melting point of the wall of the above encapsulated acidic material, and the alkaline substance remaining in the above coagulated product is neutralized by the released acidic substance.

Further, the present invention proposes a component product, in which natural polysaccharide and cellulose for food are added to the above product. The glucomannan coagulated product has a water-releasing property. However, this water-releasing property can be improved by adding other natural polysaccharides. The decrease of elasticity through neutralization can be prevented by adding the cellulose, and original elasticity can be maintained.

The glucomannan coagulated product according to this invention can be used by itself as low alkaline konjac neutral konjac, and acidic konjac. Further, by blending it with other food materials, it can be used to produce low calorie food or to improve the consistency of the food.

DETAILED DESCRIPTION OF THE INVENTION

According to this invention, a product having glucomannan as principal component is basically used. Glucomannan is contained in devil's tongue, which is the rhizome of a plant belonging to taro (Colocasia). It is a natural polysaccharide having a chemical formula, in which glucose and mannose are bonded together in a chain structure by the ratio of 1:2 and an acetyl radical and phosphoric acid are bonded together in an ester as side chain. Actually, it is composed of particles, which are called idioblasts, each having a major axis of 0.5-1.05 mm and minor axis of 0.37-0.5 mm. It is used as food material such as konjac powder or purified glucomannan. The above product may be mixed, for example, with extending agent, seasoning agent or other additive.

The present invention proposes a product having glucomannan as principal component, and comprising encapsulated acidic material or encapsulated alkaline material. Encapsulated acidic material contains acidic substance covered with a hydrophobic wall. As acidic substances, acetic acid, citric acid, fumaric acid, adipic acid, tartaric acid, malic acid, ascorbic acid, gluconic acid, succinic acid, lactic acid, etc. can be used. Encapsulated acidic material consists of fine powder or droplets of acidic substance, which is covered with a wall made of hydrophobic substance.

Encapsulated alkaline material consists of fine powder or aqueous solution of alkaline substance covered with a wall made of hydrophobic substance. As alkaline substance, calcium hyroxide, calcium oxide, sodium hydroxide, potassium hydroxide, potassium carbonate, sodium carbonate, trisodium phosphate, disodium hydrogenphosphate, etc. are used.

As wall materials, hardened oil, higher fatty acid, fatty acid monoglyceride, higher alcohol, wax, etc., which are solid at normal temperature and are not dissolved by acidic substance, are used. By covering the above acidic substance or the above alkaline substance with one or more types of such wall materials, it is possible to obtain encapsulated acidic material or encapsulated alkaline material as fine as 1 to 1000 μm. As the covering procedure, the methods already publicly known may be used such as spray dry method, spray cooling and solidifying method, flow coating method, or powder mixing surface treatment method, in which powder particles are collided and brought into contact with each other to cover the surface of the powder particles, etc.

As the hydrophobic substance to be used for this invention, hardened oil, wax, etc. may be preferably used.

The hardened oil can be obtained as follows: vegetable oil or animal oil such as coconut oil, palm kernel oil, herring oil, cod liver oil, palm oil, cottonseed oil, olive oil, peanut oil, soybean oil, linseed oil, castor oil, rape seed oil, lard, beef tallow, etc. is placed into a pressure vessel together with a catalyst such as reducing nickel. While pressurizing and heating at hydrogen pressure of 0-5 $kg/cm^2$ and temperature of 120° to 300° C., hydrogen gas is blown into the liquid oil. Thus, hydrogen is added to the double bond of unsaturated fatty acid in the liquid oil, and solid saturated or quasi-saturated fatty acid glyceride is produced. After the reaction is completed, the above catalyst is removed by filtration, and the product is deodorized and purified.

A wide variety of the hardened oils can be obtained according to the material oil or material composition or the degree of hydrogenation in the above process. The melting point differs according to each product. For example, the melting points of the "super-hardened oils" (hardened oils produced by maximum hydrogenation), i.e. glycerides of saturated fatty acids, are as shown below.

| Raw material oil for hardened oil (example) | Melting point of extremely hardened oil (°C.) |
| --- | --- |
| Rape seed oil | 67–68 |
| Coconut oil | 43–45 |
| Palm kernel oil | 43–45 |
| Herring oil | 52–55 |
| Cod liver oil | 52–55 |
| Palm oil | 56–58 |
| Cottonseed oil | 62–63 |
| Olive oil | 68–69 |
| Peanut oil | 68–69 |
| Soybean oil | 69–71 |
| Linseed oil | 69–71 |
| Castor oil | 86–90 |

The hardened oil to be used for the present invention may not necessarily to be super-hardened oil. A hardened oil of any degree of hydrogenation may be used for the invention if it meets the other requirements.

In the raw material for the encapsulated material, acidic substance must not be evaporated before the hydrophobic substance is melted by heating during the production. Therefore, the boiling point of the acidic substance must be far higher than the melting point of the hydrophobic substance.

Also, the hydrophobic substance must not be dissolved by the acidic substance. In producing the above microcapsule, the mixing ratio of acidic substance to hydrophobic substance should be preferably 99:1 to 10:90, or more preferably 70:30 to 40:60.

As the material for the above hydrophobic substance, acid-resistant material must be selected to use it as a wall for encapsulated material, which contains acidic substance. Accordingly, adequate combination must be chosen between the above acidic substance and hydrophobic substance to produce encapsulated material. The desirable combination may be as follows: Waxes are suitable for acetic acid. Waxes or hardened oils are suitable for citric acid, fumaric acid, adipic acid, tartaric acid, and malic acid.

Next, description will be given on the method to produce encapsulated material by several examples:

Product(acidic) 1

60 kg of rice wax (melting point: 79.4° C.) was heated to 90° C. to melt it. Stirring it by homo-mixer, 40 kg of fine particles of citric acid (average particle size: 20 μm) was gradually added to disperse completely. This was sprayed into a spraying system equipped with cool air unit, using an atomizer, and encapsulated citric acid with hydrophobic wall substance was obtained.

Product(acidic) 2

After mixing 70 g of fumaric acid (average particle size: 200 μm) with 30 g of soybean hardened oil (melting point: 65° C.; average particle size: 20 μm), the powder particles were collided and brought into contact with each other at the jacket temperature of 25° C. and at the stirring speed of 1200 rpm for 30 minutes by the powder mixing surface treatment method, using NARA hybridization system. Through this mixing process, the film of soybean hardened oil was formed on the fumaric acid particles, and encapsulated fumaric acid with hydrophobic wall substance was obtained.

The present invention proposes final neutralization of konjac, whereas the elasticity or the tension of konjac may be lost according to the degree of neutralization. It may become brittle and the appearance may be impaired or the taste or palatability may be decreased. According to this invention, such disadvantage can be eliminated by adding cellulose for food. Cellulose is added by 2–25 weight parts, or more preferably, 4–15 weigh parts, to 100 weight parts of glucomannan.

Further, konjac has the property to incessantly lower its water content little by little, i.e. water-lowering property, and this is disadvantageous in producing the food for long-term conservation using konjac as bonding agent for the other food materials. This water-lowering property can be extensively reduced by adding natural polysaccharides. As such natural polysaccharides, carrageenin, locust bean gum, guar gum, alginic acid, sodium alginate, xanthan gum, cyclodextrin, tamarind seed polysaccharide, agar, pullulan, pectin, etc. may be used. Starch and cellulose are exempted. One or more types of these natural polysaccharides are mixed in the product, at a mixing ratio of 5–40 weight parts, or more preferably, 9–30 weight parts, to 100 weight parts of glucomannan.

According to the present invention, the "acidic microcapsule, in which acidic substance is covered with a wall made of hydrophobic substance" is mixed with glucomannan, cellulose, natural polysaccharides and other additives to produce the desired product. This product is processed under the presence of alkaline substance such as calcium hydroxide, sodium hydroxide, potassium hydroxide, etc. to coagulate glucomannan. Then, the coagulated product thus obtained is heated to the temperature higher than the melting point of the hydrophobic substance to melt the wall of the microcapsule, and alkaline substance remaining in the coagulated product is neutralized by the released acidic substance.

This alkaline substance is usually added to the above product by 1/1000–1/10 weight %.

To coagulate the swollen product according to this invention, it may be left at normal temperature in alkalinity for a long time. If the temperature is increased, the time required for coagulation is shortened. Normally, it is coagulated in less than one hour at 60°–80° C. Also, the higher the pH value is, the shorter the time required for coagulation. It can also be coagulated by far infrared radiation. If it is heated to more than 100° C. or to 125° C. using a retort, it is possible not only to shorten the coagulation time but also to perform the coagulation process and the sterilization process at the same time.

By this invention, it is possible to use the alkaline substance as an encapsulated material. Specifically, the invention offers the above product, in which a glucomannan product contains encapsulated alkaline material, covered with a wall made of hydrophobic substance B, whose melting point is lower by 5° C. than the melting point of the hydrophobic substance A, which covers said acidic substance. Here, it is important that there is a difference between the melting points of hydrophobic substances A and B. The difference of the melting points may be the minimum difference to ensure the possibility to independently perform the processing by said alkaline substance (coagulation of glucomannan) and the processing by said acidic substance (neutralization of the remaining alkaline substance). The difference of the melting points differs according to the purity of the wall material. It is preferably 5° C. or more, or 10° C. or more, or more preferably, 15° C. or more.

As the material for hydrophobic substance B, alkali-resistant material must be selected, which is suitable as a wall of encapsulated material containing alkaline substance.

As such hydrophobic substance B, animal or vegetable hardened oils, higher fatty acid, fatty acid monoglyceride, higher alcohol, wax, etc. may be used. The preferable combination of hydrophobic substances A and B is as follows: Soybean superhardened oil (melting point: 69.3° C.) and beef tallow hardened oil (melting point: 55° C.), or rice wax (melting point: 79.4° C.) and cottonseed superhardened oil (melting point: 62.7° C.).

Next, description will be given on the method to produce encapsulated alkaline material by several examples.

Product(alkaline) 1

Under nitrogen flow, 70 g of sodium hydroxide (average particle size: 100 μm) pulverized in a stainless steel ball mill heated at 70° C. was mixed with pulverized beef tallow hardened oil (melting point 55° C.; average particle size 25 μm). Then, the powder mixing surface treatment method was performed using NARA hybridization system, and encapsulated sodium hydroxide with hydrophobic wall substance was obtained.

Product(alkaline) 2

400 g of sodium hydroxide (average particle size: 50 μm) obtained by the pulverizing method of the Example 1 above was dispersed well into 600 g of rice wax heated and melted at 90° C., stirring by a homogenizer. It is then sprayed into a spray system equipped with a cooling unit using an atomizer. Thus, encapsulated potassium hydroxide having a hydrophobic wall substance was obtained.

[Embodiment]

In the following, the word "part" used in the application of glucomannan coagulated product (konjac) and in the embodiments means "weight part".

Embodiment 1

100 parts of refined konjac powder and 2 parts of caustic soda (food additive grade) were coated in granular shape with 0.5 part of herring hardened oil. Also, 3.2 parts of citric acid was covered with 0.8 part of soybean hardened oil. Then, these two products were mixed evenly.

Then, 100 g of the above mixture was placed into a stainless steel dissolver (capacity; 5 liters) equipped with agitator and heat retaining unit. Further, 2.5 liters of warm water (40° C.) was added and it was stirred gently for 10 minutes. Then, it was left to stand for 50 minutes to swell sufficiently. When it was swollen and turned to paste, 150 g of this product was packed into a commercially available konjac bag and was placed into a (polyethylene) steam heating kettle. It was then heated at 65°±2° C. for 30 minutes, and the temperature was raised to and maintained at 75° C. for 10 minutes. After heating, the coagulated product was molded into rectangular shape. When the pH value of this konjac product was measured, it was 6.7, approximately neutral.

Embodiment 2

75 parts of refined konjac powder, 10 parts of carrageenin, 3 parts of sodium alginate, 1 part of xanthan gum, 5 parts of cellulose and 2 parts of caustic soda (food additive grade) as well as encapsulated alkaline material covered with 0.5 part of herring hardened oil and 3.2 parts of citric acid were prepared. This was mixed evenly with encapsulated acidic material covered granularly with 0.8 part of soybean hardened oil.

Similarly to the Embodiment 1, 100 g of the above mixture was processed, and konjac for processing was produced. When the pH value of this product was measured, it was approximately neutral It showed the same elasticity as normal konjac, and the water-lowering property was extremely improved.

Application Example 1

The coagulated product (konjac for processing) obtained by the Embodiment 2 was applied to prepare a kneaded product having the following composition:

| | |
|---|---|
| Ground fish meat | 100 parts |
| "Konjac paste" produced from the coagulated product of Embodiment 2 | 20 parts |
| Salt | 1.5 parts |
| Sugar | 1.5 parts |
| Glusow | 0.6 part |
| Crab extract | 2.0 parts |
| Crab flavoring agent | 0.5 part |
| Ice water | 40 parts |

The above kneaded product was stretched and molded in thin planar shape, and this was heated at 80° C. for 30 minutes. Then, it was scored and packed in a bag. Further, it was treated by retort processing at 120° C. for 20 minutes. Thus, "crab kamaboko" (boiled crab meat paste) in rod shape was produced.

When this "crab kamaboko" was tasted on trial, it was crisp and tasty. The above konjac paste has low calories. Accordingly, this "crab kamaboko" is also a low calorie food, and it is also "health food" because it contains a large quantity of food tissues.

Application Example 2

Using the coagulated product (konjac for processing) produced in the Embodiment 2, the product with the following composition was prepared:

| | |
|---|---|
| Pig red meat | 100 parts |
| Pig cheek meat | 50 parts |
| Lard | 40 parts |
| "Konjac paste" produced from the coagulated product of Embodiment 2 | 30 parts |
| Crystal cellulose | 5 parts |
| Potato starch | 15 parts |
| Gelatin | 35 parts |
| Egg white | 15 parts |
| Salt | 10 parts |
| Sugar | 1.5 parts |
| Soybean oil | 5 parts |
| White pepper | 0.5 part |
| Flavoring agent | as appropriate |
| Coloring agent | as appropriate |

After the above meat piece was cut off, it was placed in salt, minced and ground to prepare seasoned meat. This seasoned meat was packed in a so-called "bag for smoking" with lay flat width of 45 mm and was smoked to 60 minutes. Then, it was boiled at 80° C. for 20 minutes and was further sterilized at 120° C. for 15 minutes to produce sausage.

When this sausage was tasted for trial, it was tasty and palatable. Also, because it contains much food tissues, it is considered to be good for health because of its effect to control intestinal function Embodiment 3

To encapsulated acidic material covered with 1.8 parts of soybean hardened oil by powder mixing surface treatment method, 85 parts of refined konjac powder, 2 parts of carrageenin, 3 parts of gelan gum, 4 parts of cellulose and 4.2 parts of fumaric acid were added and mixed evenly. Into a stainless steel dissolver (capacity: 100 liters) equipped with agitator and heat retaining unit, 40 kg of water (40° C.) was placed, and 1.25 kg of the above mixture was added. After stirring gently for 10 minutes, it was left to stand for 2 hours to swell sufficiently. Separately, 37.5 g of calcium hydroxide was dissolved in 10 kg of water and was added to the above swollen product. Then, the mixture was kneaded by a kneader to disperse calcium hydroxide evenly.

The swollen product thus kneaded was packed into pouches by 200 g each, and this was maintained in a hot water kept at 85° C. for 30 minutes. Thus, the coagulated product (konjac) according to this invention was obtained. The pH value of this product was 6.8. It exhibited the same elasticity as normal konjac, and the water-releasing property was low (Table 1).

Comparative Example 1

Into 40 kg of water (20° C.), 1.25 kg of refined konjac powder was added by stirring. After stirring gently for 10 minutes, it was left to stand for 2 hours to swell sufficiently. Separately, 200 g of calcium hydroxide was dissolved in 10 kg of water and was dispersed evenly into the above swollen product using a kneader.

The swollen product thus kneaded was packed into pouches by 200 g each, and these were kept in hot water of 85° C. for 30 minutes for coagulation to produce normal konjac. The coagulated product had a pH value of 12.5, and the water-releasing property was high (Table 1).

TABLE 1

| | Water-lowering property *1 | Elasticity *2 | Smell | Taste |
|---|---|---|---|---|
| Embodiment 2 | 6.8 | 3% | o | No smell | Good |
| Comparative Example 1 | 12.5 | 8% | o | Alkaline smell | Acrid |

*1: $\frac{\text{Water-lowering quantity after heating}}{\text{Weight of coagulated product before heating}} \times 100$

*2: o; Very elastic

What we claim is:

1. A glucomannan product, which comprises (1) glucomannan as principal component, (2) an encapsulated acidic material which comprises an acidic substance covered with a wall of a hydrophobic substance, and (3) an encapsulated alkaline material which comprises an alkaline substance covered with a wall of a hydrophobic substance, wherein the melting point of the wall of the encapsulated alkaline material is at least 5° C. lower than the melting point of the wall of the encapsulated acidic material.

2. A glucomannan product as set forth in claim 1, wherein said acidic substance is selected from the group consisting of acetic acid, citric acid, fumaric acid, adipic acid, tartaric acid, malic acid, ascorbic acid, gluconic acid, succinic acid, lactic acid and mixtures thereof.

3. A glucomannan product as set forth in claim 1, wherein said acidic substance is selected from the group consisting of calcium hydroxide, calcium oxide, sodium hydroxide, potassium hydroxide, potassium carbonate, sodium carbonate, trisodium phosphate, disodium hydrogenphosphate and mixtures thereof.

4. A glucomannan product, which comprises (1) glucomannan as principal component, (2) an encapsulated acidic material which comprises an acidic substance covered with a wall of a hydrophobic substance, and (3) cellulose.

5. A glucomannan product as set forth in claim 4, wherein said acidic substance is selected from the group consisting of acetic acid, citric acid, fumaric acid, adipic acid, tartaric acid, malic acid, ascorbic acid, gluconic acid, succinic acid, lactic acid and mixtures thereof.

6. A glucomannan product, which comprises (1) glucomannan as principal component, (2) an encapsulated acidic material which comprises an acidic substance covered with a wall of a hydrophobic substance, and (3) cellulose and (4) a natural polysaccharide.

7. A glucomannan product as set forth in claim 6, wherein said natural polysaccharide is selected from the group consisting of carrageenin, locust bean gum, guar gum, alginic acid, sodium alginate, xanthan gum, cyclodextrin, tamarind seed polysaccharide, agar, pullulan, pectin and mixtures thereof.

8. A glucomannan product as set forth in claim 6, wherein said acidic substance is selected from the group consisting of acetic acid, citric acid, fumaric acid, adipic acid, tartaric acid, malic acid, ascorbic acid, gluconic acid, succinic acid, lactic acid and mixtures thereof.

9. A glucomannan product, which comprises (1) glucomannan as principal component, (2) an encapsulated acidic material which comprises an acidic substance covered with a wall of a hydrophobic substance, (3) an encapsulated alkaline material which comprises an alkaline substance covered with a wall of a hydrophobic substance, (4) a natural polysaccharide and (5) cellulose, wherein the melting point of the wall of the encapsulated alkaline material is lower than the melting point of the wall of the encapsulated acidic material.

10. A glucomannan product as set forth in claim 9, wherein said natural polysaccharide is selected from the group consisting of carrageenin, locust bean gum, guar gum, alginic acid, sodium alginate, xanthan gum, cyclodextrin, tamarind seed polysaccharide, agar, pullulan, pectin and mixtures thereof.

11. A glucomannan product as set forth in claim 9, wherein said acidic substance is selected from the group consisting of acetic acid, citric acid, fumaric acid, adipic acid, tartaric acid, malic acid, ascorbic acid, gluconic acid, succinic acid, lactic acid and mixtures thereof.

12. A method of coagulating glucomannan, which comprises
providing a mixture which comprises (1) glucomannan as principal component and (2) an encapsulated acidic material which comprises an acidic substance covered with a wall of a hydrophobic substance.
suspending the mixture in water,
coagulating the glucomannan at a temperature lower than the melting point of the wall in the presence of an alkaline substance,
heating the coagulated product to a higher temperature than the melting point of the wall, and
neutralizing alkaline substance remaining in the coagulated product by means of the acidic substance released from the encapsulated acidic material.

13. A method as set forth in claim 12, wherein said acidic substance is selected from the group consisting of acetic acid, citric acid, fumaric acid, adipic acid, tartaric acid, malic acid, ascorbic acid, gluconic acid, succinic acid, lactic acid and mixtures thereof.

14. A method of coagulating glucomannan, which comprises
providing a mixture which comprises (1) glucomannan as principal component, (2) an encapsulated acidic material which comprises an acidic substance covered with a wall of a hydrophobic substance, (3) a natural polysaccharide and (4) cellulose,
suspending the mixture in water,
coagulating the glucomannan at a temperature lower than the melting point of the wall in the presence of an alkaline substance,
heating the coagulated product to a higher temperature than the melting point of the wall, and
neutralizing alkaline substance remaining in the coagulated product by means of the acidic substance released from the encapsulated acidic material.

15. A method as set forth in claim 14, wherein said natural polysaccharide is selected from the group consisting of carrageenin, locust bean gum, guar gum, alginic acid, sodium alginate, xanthan gum, cyclodextrin, tamarind seed polysaccharide, agar, pullulan, pectin and mixtures thereof.

16. A method as set forth in claim 14, wherein said acidic substance is selected from the group consisting of acetic acid, citric acid, fumaric acid, adipic acid, tartaric acid, malic acid, ascorbic acid, gluconic acid, succinic acid, lactic acid and mixtures thereof.

17. A method as set forth in claim 14, wherein said alkaline substance is selected from the group consisting of calcium hydroxide, calcium oxide, sodium hydroxide, potassium hydroxide, potassium carbonate, sodium carbonate, trisodium phosphate, disodium hydrogenphosphate and mixtures thereof.

* * * * *